Sept. 1, 1931.   O. PETERSEN   1,821,272
FUEL VALVE WITH ANNULAR SEAT
Filed Aug. 25, 1927
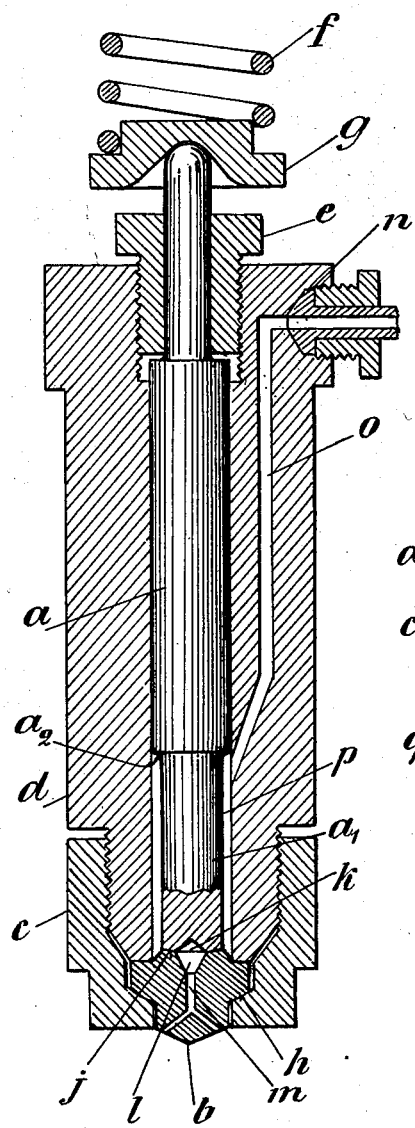
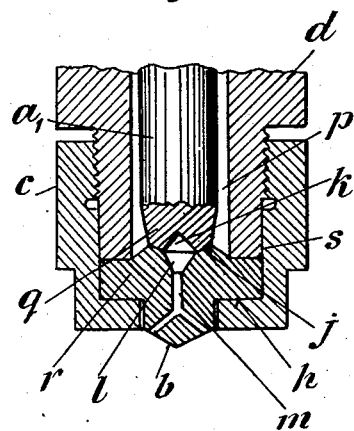
O. Petersen
INVENTOR
By Marks & Clerk
Attys.

Patented Sept. 1, 1931

1,821,272

UNITED STATES PATENT OFFICE

OVE PETERSEN, OF HELLERUP, NEAR COPENHAGEN, DENMARK

FUEL VALVE WITH ANNULAR SEAT

Application filed August 25, 1927, Serial No. 215,484, and in Denmark July 9, 1927.

This invention relates to a fuel valve for internal combustion engines of the type in which the fuel is injected directly into the cylinder by means of pump pressure exerted by a fuel pump driven by the engine, and without spraying by compressed air.

In fuel valves for this kind of engines the fuel is injected through a passage provided in an injecting nozzle, and generally the arrangement is such that the valve opens this passage or channel when the pressure of the fuel oil reaches a sufficient height, the pressure acting on an annular area consisting in the difference between the cross sectional area of the valve spindle and the valve seat area and thereby overcoming the spring tension or the like which normally keeps the valve closed. On account of the height of the pressure it is difficult to make the valve absolutely tight against its seat and also to maintain tightness during the working of the engine, as the valve gradually will become damaged on account of the fact that the spring causes the valve spindle to strike the seat with considerable force, so that the seat has to suddenly stop the movement of the spindle and to receive the total amount of energy contained therein.

According to the present invention the said drawback is overcome by providing the injecting nozzle with a drilled or bored hole, for instance of conical shape or the like, while the spindle is provided with a corresponding drilled or turned hole. In this way the end surface of the spindle becomes shaped as an annular valve seat which corresponds with the annular seat of the injecting nozzle, which latter seat may be flat, spherical or conical in shape. The said drilled or bored holes or recesses are of advantage in that the valve spindle lift may be small, namely as a result firstly of the recess in the valve seat, the inner diameter of said recess being essentially greater than the diameter of the usual central passage in the nozzle. The cross sectional passage area of a valve may namely, as will be known, be calculated as the product of the peripheral length of the inner bounding circle of the valve seat and the lift of the valve. Thus a sufficiently great passage area may be obtained even if the lift is only small, when the inner circle is large. Secondly the recess in the valve spindle forms better hydraulic properties for the flow of fluid, so that said latter recess also contributes to obtain the advantages of a small lift. Among such advantages may be mentioned that the employment of a lighter spring is made possible. A spring which shall allow a large movement must, namely, have a great number of turns or coils, whereas a spring which shall work with a small movement only needs a few coils. If the said recesses did not exist a reduction of the lift of the valve spindle would not be possible even if the outer diameter of the valve seat and the diameter of the spindle were great, because the material in the end surface of the spindle and within the valve seat, would namely restrict the cross sectional passage area. A sufficiently great bearing area for the annular valve seat may easily be obtained, namely by making the outer diameter of the spindle and the valve seat suitably greater than the inner diameter of the recesses, and at the same time the differential area of the valve spindle to be affected by the fuel oil pressure opening the valve is suitably made small, so that thereby further the employment of a small and light spring is made possible.

The invention is illustrated in the drawings, in which

Fig. 1 shows a longitudinal sectional view of a constructional form of a fuel valve according to the invention, and Fig. 2 part of another constructional form, in longitudinal sectional view.

In Fig. 1 the reference character $a$ indicates the valve spindle, $b$ the injecting nozzle and $c$ a nut serving to clamp the nozzle to the valve housing $d$. The injecting nozzle is provided with a spherically shaped end surface $h$ at bottom, which cooperates with a corresponding surface on the nut $c$. The valve housing $d$ is provided with an adjustable stop $e$ at top, which serves to restrict the lift of the valve spindle $a$. A spring $f$ tends to close the valve spindle $a$, the said spring *f* transmitting its tension through the member *g*. The lower end of the bottom portion of the valve spindle *a*, which bottom portion $a_1$ has a reduced diameter, is shaped, according to the invention, as a conical annular seat *j* surrounding a conical or cup-shaped depression or drilled hole *k*, and the injecting nozzle *b*, which is provided with a centrally arranged hole *m*, is provided with a similar drilled hole *l*. The fuel oil is admitted through the connection *n*, the channel or passage *o* and the annular space *p* surrounding the bottom portion $a_1$ of the valve spindle.

The mechanism now acts in the following way:

When the pressure on the fuel oil in the space *p* has reached a certain height, this pressure will lift the spindle *a* by its action on the annular differential area $a_2$ of the valve spindle. When the spindle is lifted away from its seat the fuel becomes capable of acting on the whole cross sectional area of the spindle. Accordingly the lifting of the spindle towards the stop will be very rapid, while its stroke against the stop will only be with small force because of the slight lift. Correspondingly the closing movement will be very rapid because of the slight lift and still without being accompanied by a hard stroke, because the energy is only small.

In the constructional form illustrated in Fig. 2, in which corresponding parts are indicated by the same reference characters as in Fig. 1, the spindle is provided at its bottom end with a conically turned portion *q* or the like, and the valve seat of the injecting nozzle *b* is similarly restricted by a surrounding conically or similarly shaped surface. The purpose hereof is to obtain that the surfaces between which the edges of the valve seats (on the spindle as well as on the injecting nozzle) are situated form the largest possible angles with each other, preferably obtuse angles, which serves to make the said edges last better, in that they are not so easily broken off during the working of the engine. In this constructional form the face *h* of the injecting nozzle *b* is made flat. The valve housing is at its lower end provided with a cylindrically turned portion *s* of a diameter corresponding to that of the injecting nozzle, and the nut *c* has a corresponding drilled hole with the same diameter. It is possible by this means to centre the injecting nozzle in its clamped position with an accuracy which is greater than that obtained by means of screw thread.

The term "upsetting" used in connection with the making of all edges with obtuse angles means the process which takes place in the material when it is exposed to violent blows and pushes, whereby the material flows out.

The seat *j* may, as shown in the drawings, be conical of shape, or it may be flat or spherically shaped. The surface area of the seat is preferably made of a size a little greater than half the cross sectional area of the valve spindle.

The invention is not bound to comprise only the constructional forms above described and set forth, but may be carried out in several different ways without thereby departing from the principles of the invention.

I claim:

1. Fuel valve for internal combustion engines of the kind in which the fuel is injected directly into the cylinder by means of pump pressure which in itself also serves to move the valve spindle away from the valve seat, characterized in that the end of the valve spindle is provided with a centrally arranged recess, the surface of which makes an angle with the annular end face of the valve spindle greater than 90° and the seat cooperating with the valve spindle being provided with a corresponding centrally arranged recess, so as to provide an annular valve seat which cooperates with the annular end face of the valve spindle when the valve is closed.

2. An improved fuel valve for internal combustion engines of the type operating with direct injection of fuel, comprising a housing, a valve spindle movable longitudinally in the housing and provided on its inner annular end face with a centrally arranged recess the surface of which makes an angle with the end face greater than 90°, and a member arranged at the end of the housing for cooperating with the spindle and provided with a correspondingly arranged central recess so as to form a valve seat which cooperates with the annular end face of the spindle when the valve is closed.

3. An improved fuel valve for internal combustion engines of the type operating with direct injection of fuel, comprising a housing, a valve spindle movable longitudinally in the housing and provided on its inner annular end face with a centrally arranged recess the surface of which makes an angle with the end face greater than 90°, and a seat plug secured to the inner end of the housing cooperating with the valve spindle and provided on its inner end face with a correspondingly arranged central recess so as to form a valve seat which cooperates with the annular end face of the spindle when the valve is closed.

4. A fuel valve as claimed in claim 2, wherein the centrally arranged recess in the spindle has its wall converged inwardly.

5. A fuel valve as claimed in claim 2, wherein the centrally arranged recess in the spindle is conical.

6. A device as claimed in claim 2, wherein the annular valve face proper formed by the end surface of the valve spindle outwardly is bounded by a conical shaped surface, which at the edge of the valve face proper forms an angle with the valve face, greater than 90°.

7. A device as claimed in claim 3, wherein the annular valve seat of the seat plug outwardly is bounded by a conical shaped surface, which at the edge of the valve seat forms an angle with the valve seat greater than 90°.

8. A device as claimed in claim 3, wherein the bearing area of the valve spindle and seat is at least half as great as the full cross sectional area of the valve spindle.

9. An improved fuel valve for internal combustion engines of the type operating with direct injection of fuel, comprising a housing, a valve spindle movable longitudinally in said housing and provided on its inner annular end face with a centrally arranged recess, a fixed member arranged at the end of the housing for cooperating with said valve spindle, a central fuel-passage in said member and said fixed member having a recess corresponding to and coacting with the recess of the valve spindle, the diameter of said recess in said fixed member being substantially greater than the diameter of the central fuel-passage.

In testimony whereof I affix my signature.

OVE PETERSEN.